(12) United States Patent
Umezawa

(10) Patent No.: US 7,362,926 B2
(45) Date of Patent: Apr. 22, 2008

(54) OPTICAL CONNECTOR

(75) Inventor: Tomoki Umezawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/525,819

(22) Filed: Sep. 25, 2006

(65) Prior Publication Data
US 2007/0183707 A1    Aug. 9, 2007

(30) Foreign Application Priority Data
Feb. 7, 2006 (JP) .............................. 2006-030074

(51) Int. Cl.
*G02B 6/12* (2006.01)
*G02B 6/26* (2006.01)
*G02B 6/36* (2006.01)

(52) U.S. Cl. ............................. 385/14; 385/16; 385/88

(58) Field of Classification Search .................. 385/14, 385/16, 88
See application file for complete search history.

(56) References Cited

U.S. PATENT DOCUMENTS

| | | | | |
|---|---|---|---|---|
| 5,499,309 | A * | 3/1996 | Kozuka et al. | 385/38 |
| 6,236,787 | B1 * | 5/2001 | Laughlin | 385/52 |
| 6,254,282 | B1 * | 7/2001 | Ishihara et al. | 385/73 |
| 6,912,332 | B2 * | 6/2005 | Han et al. | 385/14 |
| 7,116,912 | B2 * | 10/2006 | Pang et al. | 398/139 |
| 7,209,621 | B2 * | 4/2007 | Glebov et al. | 385/129 |
| 7,220,065 | B2 * | 5/2007 | Han et al. | 385/89 |
| 2004/0005119 | A1 * | 1/2004 | Han et al. | 385/49 |
| 2005/0141823 | A1 * | 6/2005 | Han et al. | 385/89 |
| 2005/0163416 | A1 * | 7/2005 | Yamada et al. | 385/14 |
| 2006/0008199 | A1 * | 1/2006 | Glebov et al. | 385/15 |
| 2006/0039658 | A1 * | 2/2006 | Furuyama et al. | 385/90 |

FOREIGN PATENT DOCUMENTS

JP        10-186187        7/1998

* cited by examiner

*Primary Examiner*—K. Cyrus Kianni
(74) *Attorney, Agent, or Firm*—Morgan, Lewis & Bockius LLP

(57) ABSTRACT

An optical connector includes: a board having a first signal-light propagation medium with a first optical signal end; and a chassis disposed on the board. The chassis includes: an insertion-and-removal section having an insertion-hole forming wall that defines an insertion hole, into which a second optical signal end of a second signal-light propagation medium is removably inserted. The wall has: a support surface. supporting a side face portion of the second signal end; and an abutting surface on which abuts a front-end portion of the second signal end. The chassis further includes an optical connection section provided with a through-hole forming wall defining a through hole optically connecting the first signal end with the inserted second signal. The optical connector further includes a biasing member that positions the second signal end inserted into the insertion-and-removal section by biasing the second signal end to both the abutting and support surfaces.

8 Claims, 4 Drawing Sheets

OPTICAL CONNECTOR

BACKGROUND (i) Technical Field

The present invention relates to an optical connector used in connecting signal-light propagation mediums such as optical fibers and optical waveguides.

(ii) Related Art

Usually the optical connector is used when the signal-light propagation mediums such as the optical fibers and the optical waveguides are connected to each other.

An optical connector having an alignment protrusion, which is provided at a coupling end portion of a connected optical fiber or an optical waveguide, and an optical connector having a recess fitted to the protrusion, which is provided at a coupling end portion, are known as examples of the conventional optical connector. The conventional optical connectors are aligned by inserting the protrusion of the optical connector into the recess of the optical connector, and the optical fibers or optical waveguides are securely connected to each other through the optical connectors.

There are also known optical connectors having outer shapes fitted to each other, which are provided at coupling end portions of the connected optical fibers or optical waveguides. The optical connectors are aligned by fitting the outer shapes of the optical connectors, and the optical fibers or optical waveguides are securely connected to each other through the optical connectors.

SUMMARY

An optical connector according to an aspect of the invention includes:
(a) a board that includes a first signal-light propagation medium propagating signal-light and having a first optical signal end allowing at least one of signal-light input and signal-light output;
(b) a chassis disposed on the board and including:
  (i) an insertion-and-removal section that includes an insertion-hole forming wall that defines an insertion hole, into which is removably inserted a second optical signal end that is provided in a second signal-light propagation medium propagating signal-light and allows at least one of signal-light input and signal-light output, the insertion-hole forming wall having:
    a support surface supporting a side face portion of the second optical signal end in an inserted state; and
    an abutting surface on which abuts a front end portion of the second optical signal end in the inserted state; and
  (ii) an optical connection section that includes a through-hole forming wall that defines a through hole piercing from a neighborhood of the abutting surface of the insertion-and-removal section to the first optical signal end and optically connecting the first optical signal end with the second optical signal end being inserted into the insertion-and-removal section; and
(c) a biasing member that is disposed in the insertion-and-removal section in a protrudable and retractable manner, and that positions the second optical signal end being inserted into the insertion-and-removal section of the chassis by biasing the second optical signal end to both the abutting surface and the support surface.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the accompanying drawings.

Figure 1:
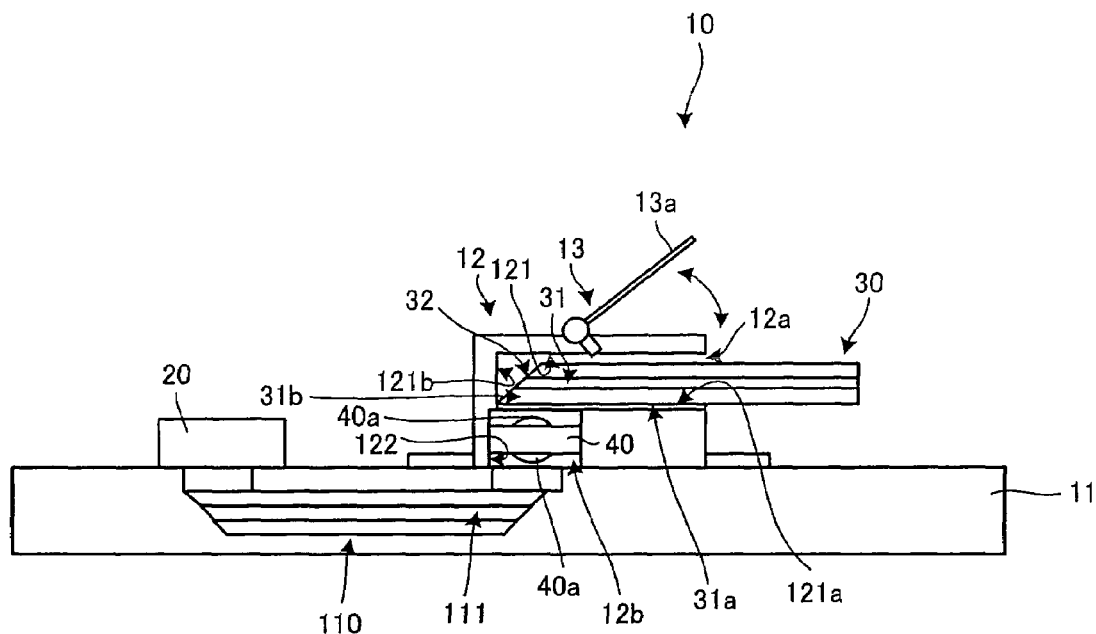
FIG. 1 is a schematic diagram showing an optical connector according to a first embodiment of the invention.

FIG. 1 is a schematic diagram showing an optical connector according to a first embodiment of the invention.

FIG. 1 shows an optical connector 10 which corresponds to an example of the optical connector in the invention.

The optical connector 10 shown in FIG. 1 includes a board 11, a chassis 12 disposed on the board 11, and a biasing member 13 having an operation lever 13a. The board 11 corresponds to an example of the board in the invention, the chassis 12 corresponds to an example of the chassis in the invention, and the biasing member 13 corresponds to an example of the biasing member of the invention.

As shown in FIG. 1, a light emitting and receiving device 20 is mounted on the board 11, and the light emitting and receiving device 20 carries the function of conversion between the electric signal and the optical signal. The light emitting and receiving device 20 receives and emits the signal-light traveling in a direction perpendicular to a surface of the board 11.

A first optical waveguide 110 is embedded in the board 11 shown in FIG. 1. The first optical waveguide 110 has a first optical signal end 111 which carries the function of at least one of signal-light input and signal-light output, and the first optical waveguide 110 carries the function of the signal-light propagation. The first optical signal end 111 corresponds to an example of the first optical signal end in the invention, and the first optical waveguide 110 corresponds to an example of the first signal-light propagation medium in the invention.

An insertion-and-removal section 12a is formed in the chassis 12 shown in FIG. 1. The insertion-and-removal section 12a includes an insertion hole forming wall 121 which forms an insertion hole, a second optical waveguide 30 has a second optical signal end 31 which is removably inserted into the insertion hole. The second optical signal end 31 carries the function of at least one of the signal-light input and the signal-light output, and the second optical waveguide 30 carries the function of the signal-light propagation. The second optical signal end 31 includes an optical path changing unit 32 at a front end portion 31b, and the optical path changing unit 32 reflects the signal-light propagating through one of the first optical waveguide 110 and the second optical waveguide 30 toward the other optical waveguide. The second optical signal end 31 corresponds to an example of the second optical signal end in the invention, and the second optical waveguide 30 corresponds to an example of the second signal-light propagation medium in the invention. The insertion hole forming wall 121 includes a support surface 121a and an abutting surface 121b. The support surface 121a supports a side face portion 31a of the second optical signal end 31 which is in the inserted state, and a front end portion 31b of the second optical signal end 31 which is in the inserted state abuts on the abutting surface 121b.

An optical connection section 12b is also formed in the chassis 12 shown in FIG. 1. The optical connection section 12b includes a through hole forming wall 122 which forms a through hole. The through hole pierces toward the first optical signal end 111 from a neighborhood of the abutting surface 121b in the insertion-and-removal section 12a, and the through hole optically connects the first optical signal end 111 and the second optical signal end 31 which is inserted into the insertion-and-removal section 12a. An optical coupling member 40 having a collective lens 40a is disposed in the optical connection section 12b. The collective lens 40a forms a signal path for the optical signal which is transmitted between the first optical signal end 111 and the second optical signal end 31 inserted into the insertion-and-removal section 12a.

Figure 2:
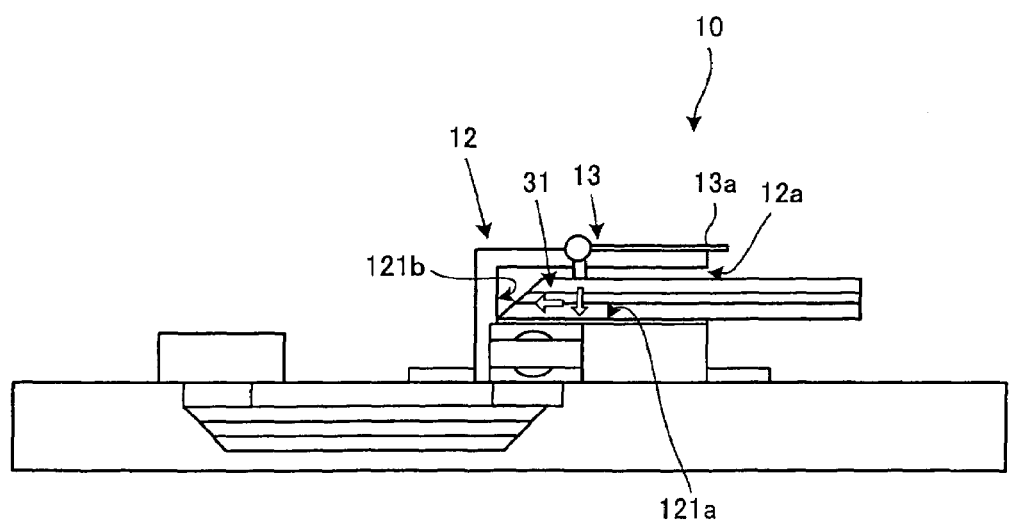
FIG. 2 is a view showing a state in which a second optical signal end inserted into an insertion-and-removal section of a chassis of the optical connector shown in FIG. 1 is fixed.

FIG. 2 is a view showing a state in which the second optical signal end 31 inserted into the insertion-and-removal section 12a of the chassis 12 of the optical connector 10 shown in FIG. 1 is fixed.

As shown in FIGS. 1 and 2, the biasing member 13 is disposed in the insertion-and-removal section 12a in a protrudable and retractable manner. The second optical signal end 31 inserted into the insertion-and-removal section 12a is positioned while biased to both the abutting surface 121b and the support surface 121a by pressing down the operation lever 13a as shown in FIG. 2.

As described above, the optical connector 10 of the first embodiment has the configuration in which the optical connection is achieved by directly inserting the second optical signal end 31 of the second optical waveguide 30, in which the optical connector is not provided in the coupling end portion, into the insertion-and-removal section 12a. Therefore, the optical connector which is further reduced in size and thickness is provided compared with the conventional optical connector in which the optical connector is provided in each coupling end portion of the signal-light propagation medium.

In the optical connector 10 of the first embodiment, the second optical signal end 31 inserted into the insertion-and-removal section 12a is positioned while biased to both the abutting surface 121b and the support surface 121a by the biasing member 13 disposed in the protrudable and retractable manner in the insertion-and-removal section 12a of the chassis 12 in which the insertion-and-removal section 12a including the insertion hole forming wall 121 and the optical connection section 12b including the through hole forming wall 122 are formed. Therefore, the optical connection is performed securely and accurately between the first optical signal end 111 and the second optical signal end 31 inserted into the insertion-and-removal section 12a by protruding the biasing member 13 into the insertion-and-removal section 12a, so that the second optical signal end 31 can be inserted and removed by accommodating the biasing member 13 in the insertion-and-removal section 12a.

In the optical connector 10 of the first embodiment, the optical coupling member 40 is disposed in the optical connection section 12b, so that the optical signal can be transmitted more securely between the first optical signal end 111 and the second optical signal end 31 inserted into the insertion-and-removal section 12a.

Then, a second embodiment of the invention will be described.

Because the second embodiment has the same configuration as the first embodiment, the description will draw attention to the difference between the first and second embodiments. In the second embodiment, the same component is designated by the same reference numeral, and the description will not be described.

Figure 3:
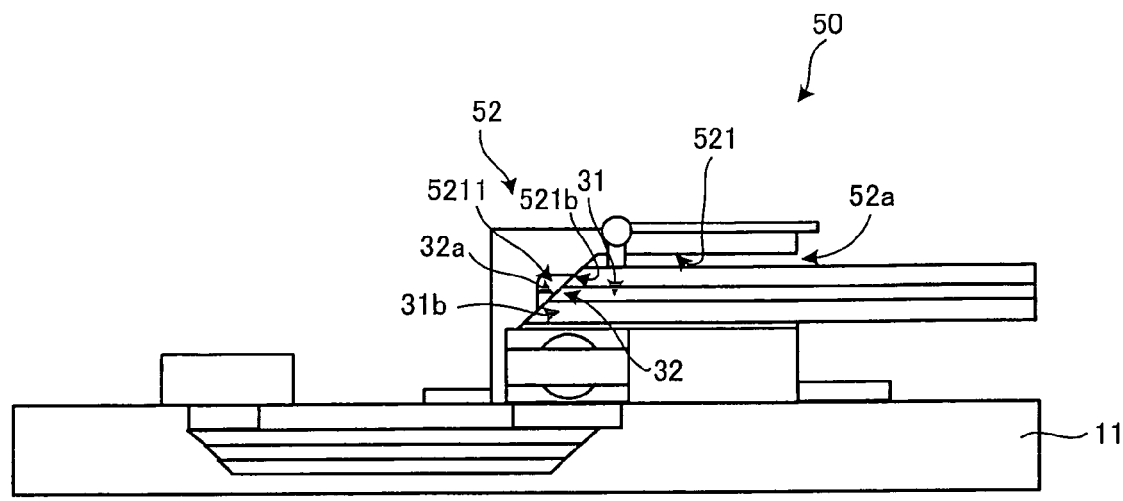
FIG. 3 is a schematic diagram showing an optical connector according to a second embodiment of the invention.

FIG. 3 is a schematic diagram showing an optical connector according to the second embodiment of the invention.

An optical connector 50 shown in FIG. 3 includes a chassis 52 disposed on the board 11. The chassis 52 corresponds to an example of the chassis in the invention.

An insertion-and-removal section 52a is formed in the chassis 52 shown in FIG. 3. The insertion-and-removal section 52a includes an insertion hole forming wall 521 which forms an insertion hole, and the second optical signal end 31 is removably inserted into the insertion hole. The insertion hole forming wall 521 includes an abutting surface 521b, and the front end portion 31b of the second optical signal end 31 which is in the inserted state is caused to abut on the abutting surface 521b. The abutting surface 521b has a shape in which the surface of the abutting surface 521b receives the front end portion 31b of the second optical signal end 31. In the abutting surface 521b, a recess 5211 is also provided in a portion opposed to a core portion 32a in the optical path changing unit 32 of the second optical signal end 31 inserted into the insertion-and-removal section 52a. The signal-light propagates through the core portion 32a. In the recess 5211, a gap is formed while the front end portion 31b of the second optical signal end 31 abuts on the abutting surface.

According to the optical connector 50 of the second embodiment, the optical path is securely changed in the optical path changing unit 32 of the second optical signal end 31 by the difference in refractive index between the core portion 32a through which the signal-light of the second optical signal end 31 propagates and air in the gap formed by the recess 5211. Because the abutting surface 521b has the shape in which the surface of the abutting surface 521b receives the front end portion 31b of the second optical signal end 31, the positioning can be performed more accurately, and deformation of the front end portion 31b can be prevented.

Then, a third embodiment of the invention will be described.

Because the third embodiment has the same configuration as the first embodiment, the description will draw attention to the difference between the first and third embodiments. However, in the third embodiment, the same component is designated by the same reference numeral, and the description will not be described.

Figure 4:
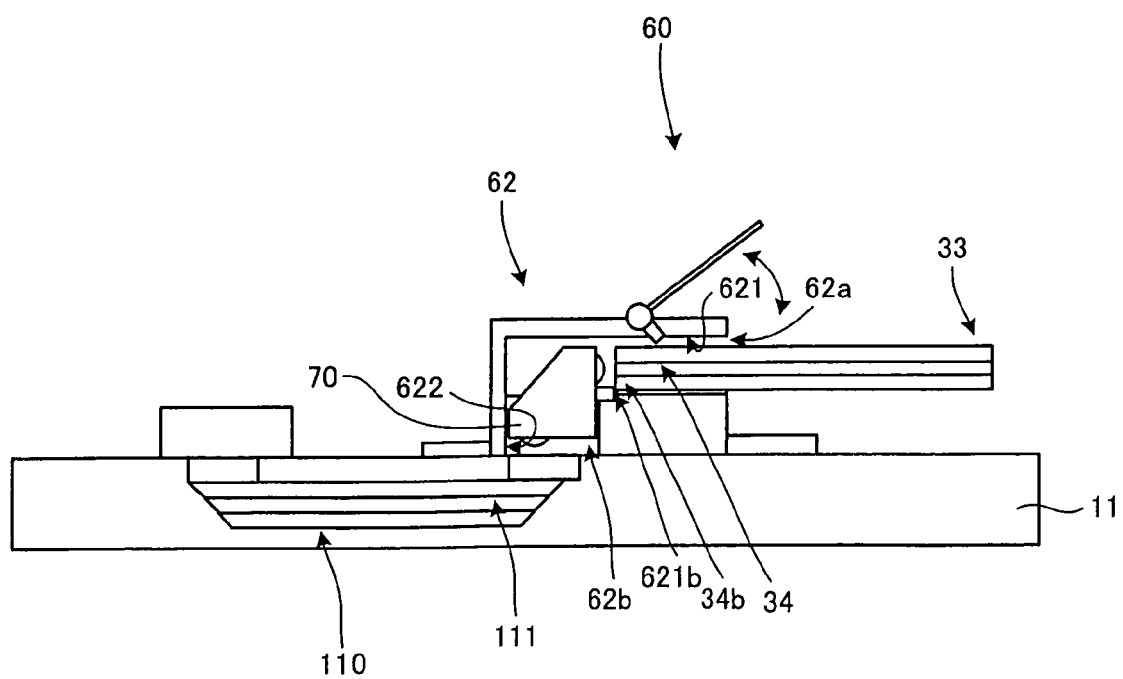
FIG. 4 is a schematic diagram showing an optical connector according to a third embodiment of the invention.

FIG. 4 is a schematic diagram showing an optical connector according to the third embodiment of the invention.

An optical connector 60 shown in FIG. 4 includes a chassis 62 disposed on the board 11. The chassis 62 corresponds to an example of the chassis in the invention.

An insertion-and-removal section 62a is formed in the chassis 62 shown in FIG. 4. The insertion-and-removal section 62a includes an insertion hole forming wall 621 which forms an insertion hole, and a third optical signal end 34 of a third optical waveguide 33 is removably inserted into the insertion hole. The third optical signal end 34 carries the function of at least one of the signal-light input and the signal-light output, and the third optical waveguide 33 carries the function of the signal-light propagation. The third optical signal end 34 corresponds to an example of the second optical signal end in the invention, and the third optical waveguide 33 corresponds to an example of the second signal-light propagation medium in the invention. The insertion hole forming wall 621 includes an abutting surface 621b, and a front end portion 34b of the third optical signal end 34 which is in the inserted state abuts on the abutting surface 621b.

An optical connection section 62b is also formed in the chassis 62 shown in FIG. 4. The optical connection section 62b includes a through hole forming wall 622 which forms a through hole. The through hole pierces toward the first optical signal end 111 from the neighborhood of the abutting surface 621b in the insertion-and-removal section 62a, and the through hole optically connects the first optical signal end 111 and the third optical signal end 34 inserted into the insertion-and-removal section 62a each other. An optical path changing member 70 is disposed in the optical connection section 62b. The optical path changing member 70 reflects the signal-light propagating through one of the first optical waveguide 110 and the third optical waveguide 33 toward the other optical waveguide.

According to the optical connector 60 of the third embodiment in which the optical path changing member 70 is previously disposed in the optical connection section 62b, even if the optical path change is required in the optical connector, because the optical path changing unit is not required at the front end portion 34b of the third optical signal end 34 inserted into the insertion-and-removal section 62a, there is a small risk to the deformation or damage at the front end portion 34b of the third optical signal end 34, and the position reproducibility is high in repeating the multiple times of insertion and removal.

Then, a fourth embodiment of the invention will be described.

Because the fourth embodiment has the same configuration as the third embodiment, the description will draw attention to the difference between the third and fourth embodiments. In the fourth embodiment, the same component is designated by the same reference numeral, and the description will not be described.

Figure 5:
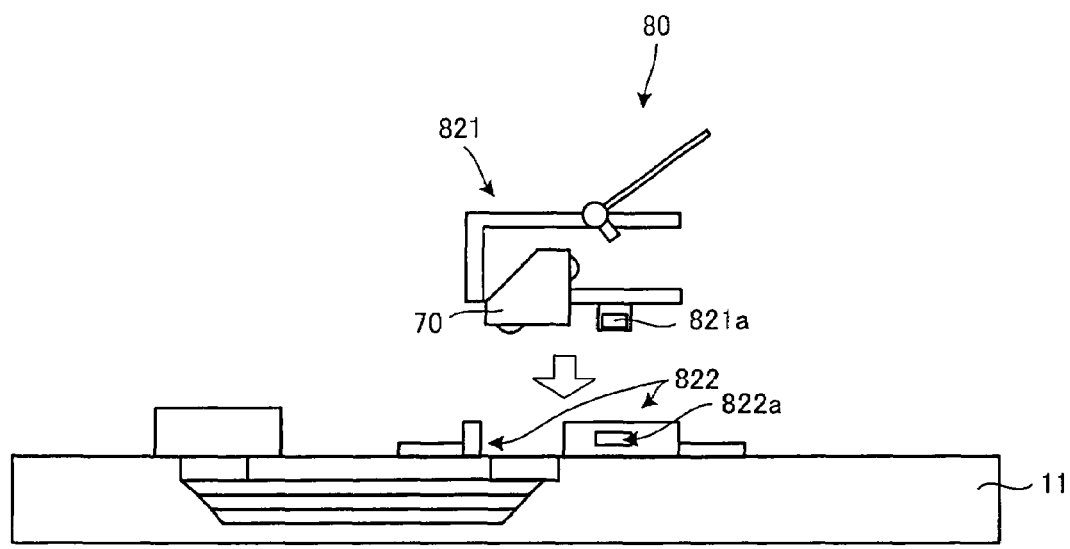
FIG. 5 is a schematic diagram showing an optical connector according to a fourth embodiment of the invention.

FIG. 5 is a schematic diagram showing an optical connector according to the fourth embodiment of the invention.

An optical connector 80 shown in FIG. 5 includes a chassis 821 and a chassis base portion 822. The chassis 821 is detachably attached onto the board 11, and the chassis base portion 822 is used to attach the chassis 821 on to the board 11. The chassis 821 corresponds to an example of the chassis in the invention.

A protrusion 821a is provided in the chassis 821, and a hole 822a into which the protrusion 821a is fitted is provided in the chassis base portion 822.

Figure 6:
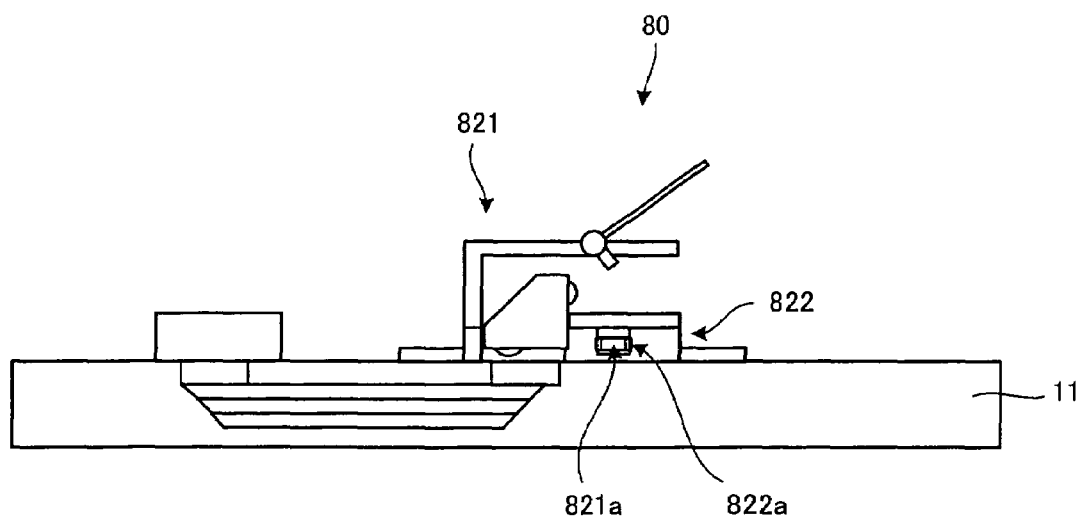
FIG. 6 is a view showing a state in which a chassis 821 shown in FIG. 5 is attached onto a board.
Figure 7:
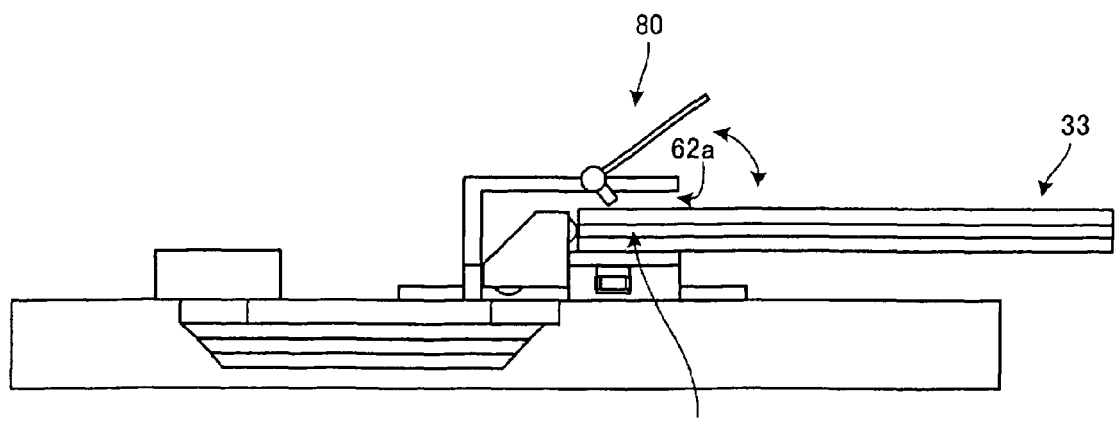
FIG. 7 is a view showing a state in which a third optical signal end of a third optical waveguide is inserted into the insertion-and-removal section of the chassis attached onto the board.

FIG. 6 is a view showing a state in which the chassis 821 shown in FIG. 5 is attached onto the board 11, and FIG. 7 is a view showing a state in which the third optical signal end 34 of the third optical waveguide 33 is inserted into the insertion-and-removal section 62a of the chassis 821 attached onto the board 11.

As shown in FIG. 6, the chassis 821 is attached and fixed onto the board 11 by fitting the protrusion 821a provided in the chassis 821 into the hole provided in the chassis base portion 822.

Then, as shown in FIG. 7, the third optical signal end 34 of the third optical waveguide 33 is inserted into the insertion-and-removal section 62a of the chassis 821 attached onto the board 11.

According to the optical connector 80 of the fourth embodiment, an electric circuit and the like are soldered onto the board 11 before the low heat-resistant optical connector 80 including the optical path changing member 70 is attached, and the low heat-resistant optical connector 80 can be attached in the state in which the heat does not need to be applied to the board 11.

In the fourth embodiment, the chassis of the optical connector including the optical path changing member is detachably attached to the board. The optical connector including the optical coupling member shown in the first and second embodiments can also yield the same effect by employing the configuration in which the chassis of the optical connector is detachably attached to the board.

Then, a fifth embodiment of the invention will be described.

Because the fifth embodiment has the same configuration as the third embodiment, the description will draw attention to the difference between the third and fifth embodiments. However, in the fifth embodiment, the same component is designated by the same reference numeral, and the description will not be described.

Figure 8:
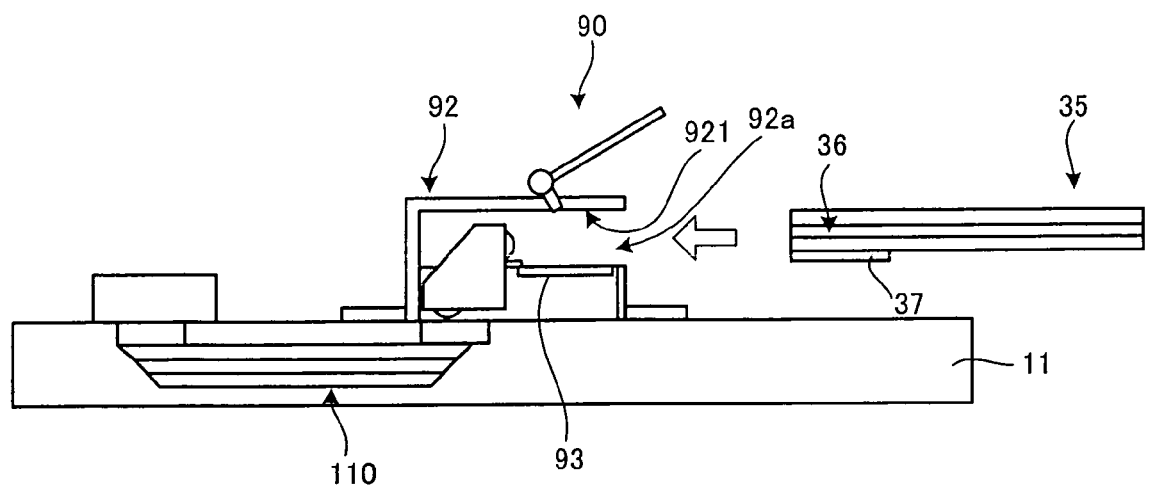
FIG. 8 is a schematic diagram showing an optical connector according to a fifth embodiment of the invention.
Figure 9:
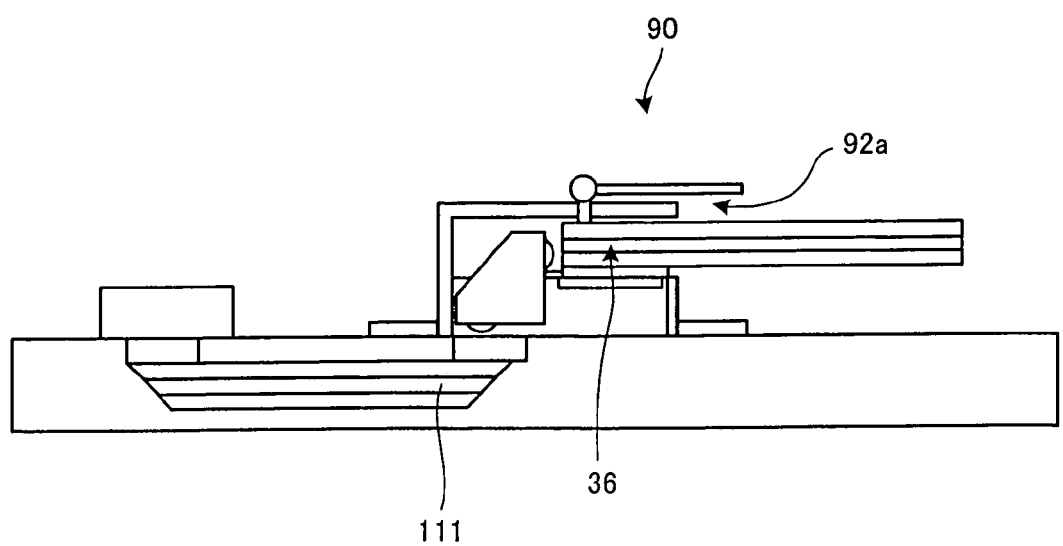
FIG. 9 is a view showing a state in which a fourth optical signal end of a fourth optical waveguide is inserted and fixed into the insertion-and-removal section of the chassis shown in FIG. 8.

FIG. 8 is a schematic view showing an optical connector according to the fifth embodiment of the invention, and FIG. 9 is a view showing a state in which a fourth optical signal end 36 of a fourth optical waveguide 35 is inserted and fixed into an insertion-and-removal section 92a of a chassis 921 shown in FIG. 8.

The optical connector 90 shown in FIG. 8 includes the board 11 and a chassis 92 disposed on the board 11. The chassis 92 corresponds to an example of the chassis in the invention.

The board 11 shown in FIG. 8 has an electroconductive pattern in addition to a first optical waveguide 110.

An insertion-and-removal section 92a is formed in the chassis 92 shown in FIG. 8. The insertion-and-removal section 92a includes an insertion hole forming wall 921 which forms an insertion hole, the fourth optical waveguide 35 includes the fourth optical signal end 36, and the fourth optical signal end 36 is removably inserted into the insertion hole. The fourth optical waveguide 35 carries the functions of the signal-light propagation and electric signal transmission. The fourth optical signal end 36 carries the function of at least one of the signal-light input and the signal-light output, and a connection terminal 37 of the electric signal is provided in the fourth optical signal end 36. The fourth optical signal end 36 corresponds to an example of the second optical signal end in the invention, and the fourth optical waveguide 35 corresponds to an example of the second signal-light propagation medium in the invention. The insertion-and-removal section 92a has an electric contact 93 which is electrically connected to the electroconductive pattern of the board 11, and the electroconducpattern is in contact with a connection terminal 37 provided in the fourth optical signal end 36 which is in the inserted state.

In the electric board, for example, when a large amount of data is transmitted at high speed between IC and a memory the signal is weakened by generation of an electromagnetic wave, which results in a problem that the signal is hardly transmitted in a long distance or large amount of energy is required. Therefore, there is developed the opto-electric fusion board in which the electric board and the signal-light propagation medium are integrated. In the opto-electric fusion board, the electric medium is replaced by the optical medium to transmit the large amount of data at high speed on the board.

According to the optical connector 90 of the fifth embodiment, as shown in FIG. 9, the optical connection between the first optical signal end 111 and the fourth optical signal end 36 inserted into the insertion-and-removal section 92a and the electric connection between the electroconductive pattern and the fourth optical signal end 36 inserted into the insertion-and-removal section 92a can easily be performed at the same time.

In the above embodiments, the optical waveguide is used as the first signal-light propagation medium and second signal-light propagation medium in the invention. However, the first signal-light propagation medium and second signal-light propagation medium in the invention are not limited to the optical waveguide, but optical fiber and the like may be used as the first signal-light propagation medium and second signal-light propagation medium in the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. An optical connector comprising:
   (a) a board that includes a first signal-light propagation medium and having a first optical signal end allowing at least one of signal-light input and signal-light output;
   (b) a chassis disposed on the board and including:
      (i) an insertion-and-removal section that includes an insertion-hole forming wall that defines an insertion hole, into which is removably inserted a second optical signal end that is provided in a second signal-light propagation medium and allows at least one of signal-light input and signal-light output, the insertion-hole forming wall having:
         a support surface supporting a side face portion of the second optical signal end in an inserted state; and
         an abutting surface on which abuts a front end portion of the second optical signal end in the inserted state; and
      (ii) an optical connection section that includes a through-hole forming wall that defines a through hole piercing from a neighborhood of the abutting surface of the insertion-and-removal section to the first optical signal end and optically connecting the first optical signal end with the second optical signal end being inserted into the insertion-and-removal section; and
   (c) a biasing member that is disposed in the insertion-and-removal section in a protrudable and retractable manner, and that positions the second optical signal end being inserted into the insertion-and-removal section of the, chassis by biasing the second optical signal end to both the abutting surface and the support surface.

2. The optical connector according to claim 1, wherein the insertion-and-removal section allows the second optical signal end of the second signal-light propagation medium to be removably inserted in the insertion-and-removal section, the second optical signal end including, at a front end portion of the second optical signal, an optical-path changing unit that reflects the signal-light propagating through one of the first and second signal-light propagation mediums toward the other one of the first and second signal-light propagation mediums.

3. The optical connector according to claim 2, wherein the abutting surface has a recess that defines a cavity in a position facing a portion of the optical-path changing unit, through which portion the signal-light propagates when the second optical signal end is inserted into the insertion-and-removal section, in the state where the front end portion of the second optical signal end is caused to abut on the abutting surface.

4. The optical connector according to claim 1, wherein the chassis further includes an optical coupling member disposed in the optical connection section and having a collective lens, the optical coupling member forming a signal path for the optical signal transmitted between the first optical signal end and the second optical signal end being inserted into the insertion-and-removal section.

5. The optical connector according to claim 4, wherein the chassis is detachably attached onto the board.

6. The optical connector according to claim 1, wherein the chassis further includes an optical path changing member that is disposed in the optical connection section and that reflects the signal-light propagating through one of the first and second signal-light propagation mediums to the other one of the first and second signal-light propagation mediums.

7. The optical connector according to claim 6, wherein the chassis is detachably attached onto the board.

8. The optical connector according to claim 1, wherein the board further includes an electroconductive pattern in addition to the first optical signal end, and
   the insertion-and-removal section includes the insertion-hole forming wall that defines the insertion hole, into which is removably inserted a second optical signal end that is provided in a second signal-light propagation medium propagating signal-light and transmitting electric signal, is provided with a connection terminal for electric signal, and allows at least one of signal-light input and signal-light output, and the insertion-and-removal section further includes an electric contact that is electrically connected to the electroconductive pattern and that is in contact with the connection terminal provided in the second optical signal end in the inserted state.

* * * * *